April 17, 1951 P. W. SEEWER 2,549,337
HYDRAULIC VALVE

Filed Jan. 2, 1946 4 Sheets-Sheet 1

Inventor:
Paul W. Seewer
by Babcock & Babcock
Attorney

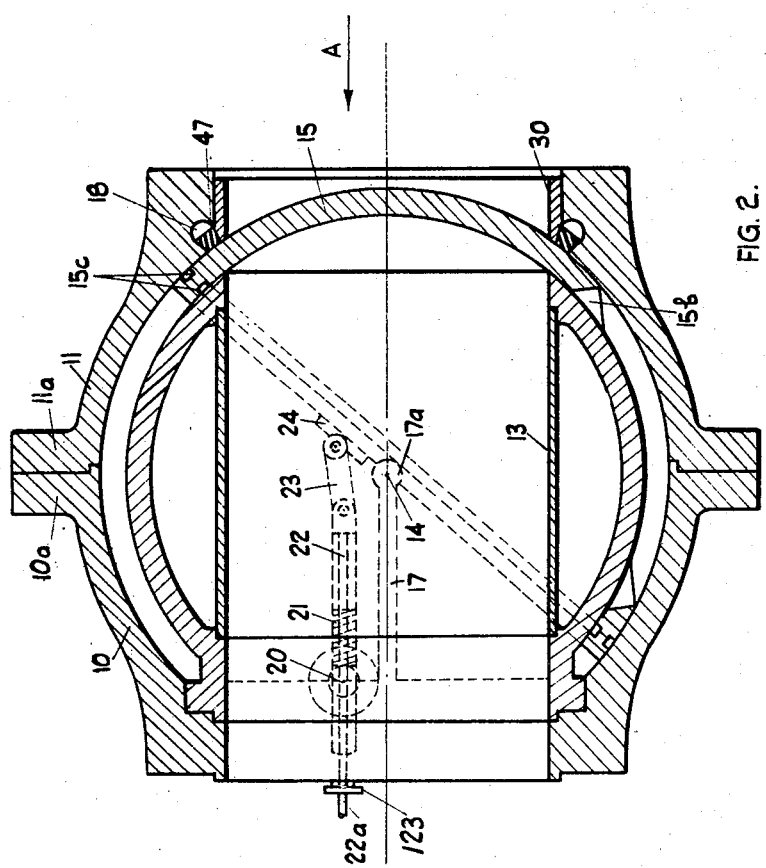

April 17, 1951 P. W. SEEWER 2,549,337
HYDRAULIC VALVE

Filed Jan. 2, 1946 4 Sheets-Sheet 3

Inventor
Paul W. Seewer
by Babcock & Babcock
Attorneys

April 17, 1951     P. W. SEEWER     2,549,337
HYDRAULIC VALVE

Filed Jan. 2, 1946     4 Sheets—Sheet 4

Inventor:
Paul W. Seewer
by Babcock & Babcock
Attorneys

Patented Apr. 17, 1951

2,549,337

UNITED STATES PATENT OFFICE 2,549,337

HYDRAULIC VALVE

Paul Werner Seewer, Rugby, England, assignor to The English Electric Company Limited, London, England, a British company Application January 2, 1946, Serial No. 638,623
In Great Britain January 6, 1945

3 Claims. (Cl. 137—139)

The invention relates to a sluice valve of a type comprising a casing, a stationary duct arranged inside that casing co-axially with, and of substantially the same diameter as, the pipe line, and a gate shaped as a hollow body of rotation rotatable about an axis perpendicular to the axis of the pipe line and having a port in its circumference registering with the said duct in its open position.

Such hollow bodies of rotation have been made as part-cylinders or part-spheres connected by means of hub-portions with axle stems on which they are pivoted, and by means of which they are operated from outside.

It is a feature of the invention that the sluice gate is of part-spherical shape free from hub-connection with an external operating shaft so that it is not made unduly rigid by such necessarily stiff hub-portions.

According to a further development of the invention the space enclosed between the gate, the casing and the guide surface is divided into two compartments each of which is adapted to be exposed to variable fluid pressure for the purpose of opening and closing the gate.

Figure 1:
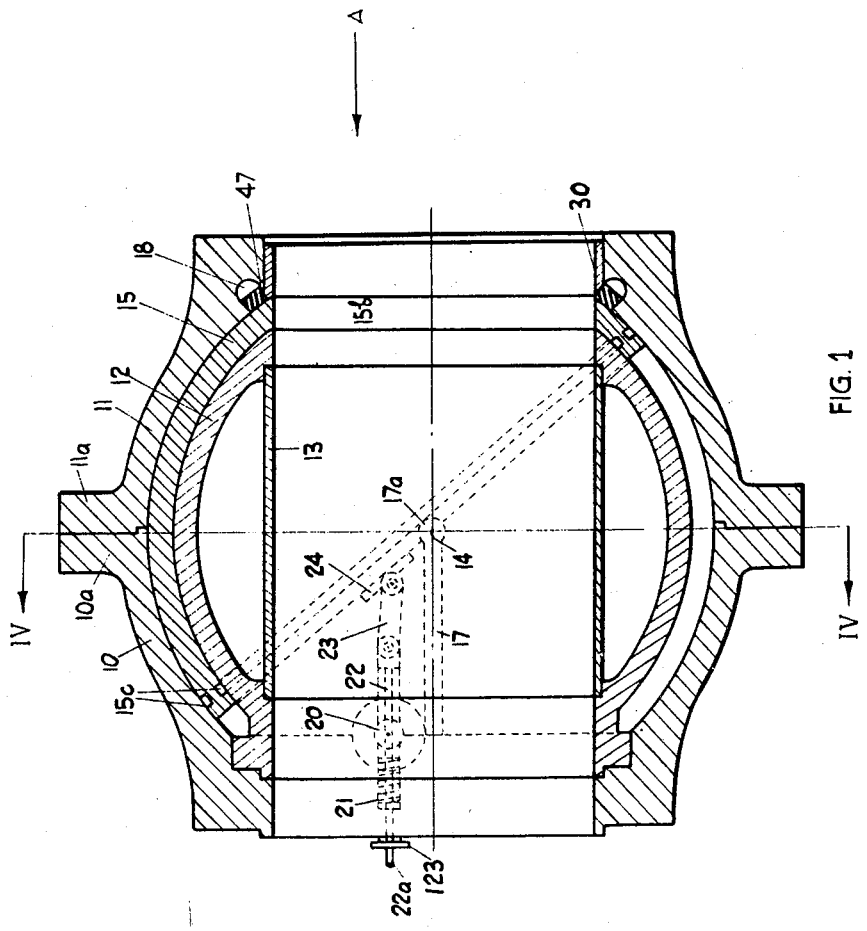
Figure 4:
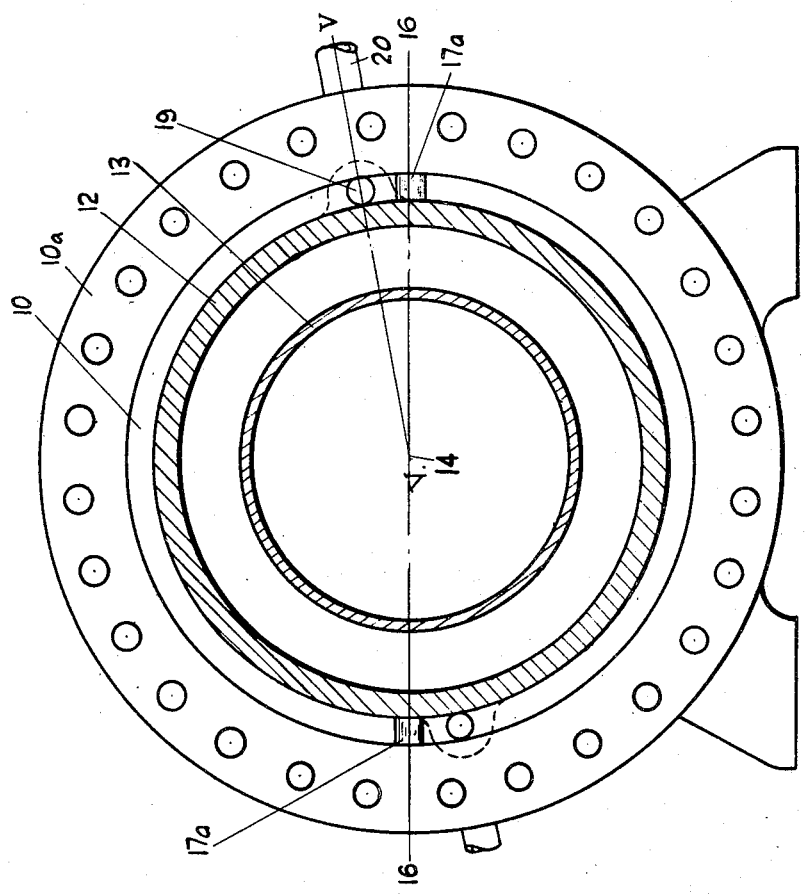
Figure 3:
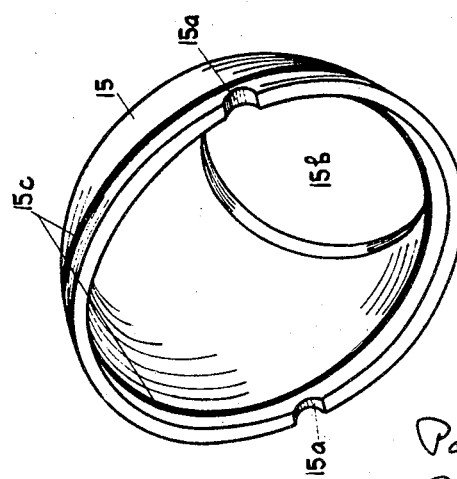
Figure 5:
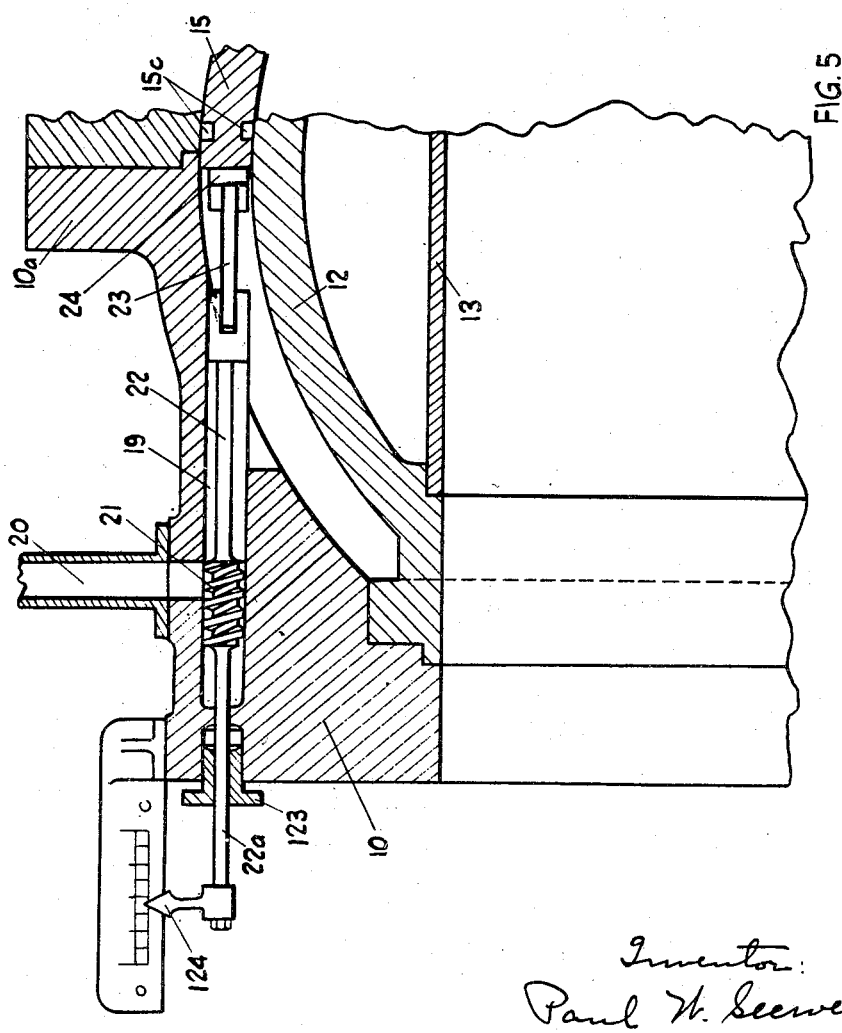

The accompanying drawings illustrate the invention in preferred form. Figs. 1 and 2 are longitudinal sectional views of the valve, Fig. 1 showing the valve open and Fig. 2 showing the valve shut; Fig. 3 is a perspective view of the gate for the valve; Fig. 4 is a cross-sectional view taken on the plane indicated at IV—IV of Fig. 1 looking in the direction of the arrow A, but with the gate removed; and Fig. 5 is a sectional partial view taken on the plane V—V of Fig. 4, showing the valve half-closed.

The body of the valve comprises a housing which is divided into two parts 10 and 11. These parts are joined by bolting together the flanges 10a, 11a. The body also comprises a member 12 within which there is inserted a cylinder 13 which forms the main part of the passageway and which has the same internal diameter as the penstock or pipe to which the valve is to be connected. The main interior surfaces of housing members 10 and 11 are part-spherical and the main exterior surface of member 12 is also part-spherical. These surfaces are all centered at a point 14 which lies on the longitudinal axis of cylinder 13.

The gate 15, which is seen alone in perspective view in Fig. 3, consists essentially of a hollow hemisphere having a hole 15b of equal diameter with the inside of cylinder 13 to provide the passage-way when the valve is open. Two semi-cylindrical recesses 15a are formed in the rim of gate 15 on an axis which lies along diameters of the inside and outside surfaces of gate 15. The gate is mounted so that these recesses 15a engage with pins 17a, to form a knuckle joint and is thus constrained to pivot about the axis 16—16 (Fig. 4) of these pins. This axis intersects perpendicularly the longitudinal axis of cylinder 13.

The cavity between body member 12 and housing members 10 and 11 receives, both when the valve is open and when it is closed, that part of the gate 15 which is not in operative position.

The valve is intended primarily to withstand water pressure in the direction of arrow A. The cavity in the valve body presents part-spherical surfaces, namely the exterior surface of member 12 and the interior surfaces of members 10 and 11, which fit closely to the inside and outside surfaces of gate 15 in every attitude throughout its travel. The inside surface of the gate 15, being the downstream face, requires bearing support. This is provided, at all times throughout the travel of the gate, by a large area of the exterior surface of member 12 supporting that part of the gate which, at any instant, is not in operative position.

It will be observed that the construction of this valve is very compact. The internal diameter of the gate need be only about one-and-a-half times the diameter of the passage-way; and the external diameter of the housing, apart from flanges 10a, 11a, need be only about twice the diameter of the passage-way.

In order to seal the body cavity from the penstock or pipe from which the flow to the valve is received, a rubber ring 47 is provided in an annular cavity 18. When the valve has been closed, fluid pressure is applied in cavity 18 to compress this rubber ring against the gate 15; but this pressure is removed before the position of the gate is changed. The rubber ring can be removed and renewed when necessary by removing a short cylinder 30 from housing member 11.

In order to operate the valve, the cavity between member 12 and members 10 and 11 is used as a fluid pressure cylinder, the gate itself serving as piston. The cavity is divided by horizontal barriers 17, one on each side of the passage-way. These barriers terminate in the pins 17a of the knuckle joint about which gate 15 is pivoted.

A port 19 for the cavity above barriers 17 is connected to a fluid pressure supply and exhaust pipe 20 through a throttle formed by a worm 21 which is arranged to be moved axially across the mouth of pipe 20. This worm 21 is mounted on rod 22 which is coupled through link 23 to a block 24 fastened on the rim of gate 15. When the valve is open, the worm 21 offers no obstruction to the flow of operating fluid between port 19 and pipe 20. When the valve approaches the closed position, however, a continuously increasing length of worm 21 becomes interposed between pipe 20 and port 19, and so the speed of movement of the gate 15 is decreased. Similarly, when the valve is being opened, the speed of movement is initially kept low by this means. Now, owing to the cooperation of the circular shape of the hole in the gate and the circular cross-section of the passage-way, the rate of change of area of opening of the valve with speed of movement is very low when the valve is nearly shut. The combination of this feature with the slow speed of movement gives the result that the speed at which the valve begins to open and the speed at which it finally closes are very low indeed in comparison with the speed of opening when the valve is over half way open. Consequently, it is not necessary to provide a by-pass valve where gentle priming is desired, e. g. for starting a turbine, before the main gate is opened.

An extension 22a of rod 22 passes through a gland 123 and carries a pointer 124 moving over a scale to indicate the degree of opening of the valve.

The port for the cavity below barriers 17 is situated diametrically opposite port 19 and may, if desired, be provided with a similar throttle arrangement.

Grooves 15c are cut around the rim of gate 15, both on the inside and on the outside, to receive piston rings to minimize leakage from the cavities when fluid pressure operation is employed.

What I claim as my invention and desire to secure by Letters Patent is:

1. A sluice valve comprising a casing having a concave part-spherical guide surface at its inside, a convex part-spherical stationary guide body concentric with the said concave part-spherical guide surface, a hollow part-spherical gate body of substantially uniform wall thickness throughout, concentrically arranged with and adapted to be guided by the said concave part-spherical guide surface from outside and the said convex part-spherical body from inside, a stationary cylindrical duct arranged inside the said convex part-spherical guide body co-axially with, and of substantially the same diameter as, the entrance and exit of the said casing, the said gate having a port of a diameter substantially equal to that of the said cylindrical duct, and hydraulic operating means inside the said casing adapted to turn the said gate about a geometrical axis through the center of the spheres perpendicular to the axis of the said cylindrical duct between the extreme positions of closing the passage through the said cylindrical duct and fully registering its port with the said cylindrical duct.

2. A sluice valve as claimed in claim 1 in which said hydraulic operating means comprises barriers arranged between the said concave part-spherical guide surface and the said convex part-spherical guide body dividing the space confined between the said concentric stationary part-spherical elements and the edge of the movable part-spherical gate into two fluid-tight compartments adapted to be alternately connected to fluid pressure and exhaust, for the purpose of turning the said gate from one of the said extreme positions to the other.

3. A sluice valve as claimed in claim 2 in which the said barriers terminate in pins coaxial with the geometrical axis through the center of the spheres perpendicular to the axis of the stationary duct, and the said semi-spherical gate has two semi-cylindrical recesses adapted to be engaged by the said pins.

PAUL WERNER SEEWER.

REFERENCES CITED

The following references are of record in the file of this patent:

UNITED STATES PATENTS

| Number | Name | Date |
|---|---|---|
| 1,656,183 | Enz | Jan. 17, 1928 |
| 1,656,184 | Enz | Jan. 17, 1928 |

FOREIGN PATENTS

| Number | Country | Date |
|---|---|---|
| 511,268 | Germany | Oct. 28, 1930 |
| 534,162 | Germany | Sept. 23, 1931 |